(12) United States Patent
Hall

(10) Patent No.: US 9,407,817 B2
(45) Date of Patent: Aug. 2, 2016

(54) IMAGER DEVICE FOR FUSING AN IMAGE FROM MULTIPLE SOURCES

(71) Applicant: Manufacturing Techniques, Inc., Kilmarnock, VA (US)

(72) Inventor: John M. Hall, Stafford, VA (US)

(73) Assignee: Manufacturing Techniques, Inc., Kilmarnock, VA (US)

( * ) Notice: Subject to any disclaimer, the term of this patent is extended or adjusted under 35 U.S.C. 154(b) by 195 days.

(21) Appl. No.: 13/961,178

(22) Filed: Aug. 7, 2013

(65) Prior Publication Data

US 2015/0256743 A1 Sep. 10, 2015

Related U.S. Application Data

(60) Provisional application No. 61/680,489, filed on Aug. 7, 2012.

(51) Int. Cl.
| | |
|---|---|
| H04N 5/228 | (2006.01) |
| H04N 5/225 | (2006.01) |
| G02B 23/12 | (2006.01) |
| H04N 5/232 | (2006.01) |
| H04N 5/33 | (2006.01) |

(52) U.S. Cl.
CPC ............ *H04N 5/23229* (2013.01); *H04N 5/33* (2013.01)

(58) Field of Classification Search
CPC ..... H04N 5/33; H04N 5/332; H04N 5/23254; H04N 5/2253; G01S 17/89; G01S 2013/9332; G01S 2013/9339; G01S 2013/9357; G01S 19/42; G01S 2013/9375; B60W 2050/0073; B60W 2050/0078; B60W 2420/403
USPC ................. 348/208.1, 222.1, 362; 359/211.1, 359/211.2, 353; 250/323
See application file for complete search history.

(56) References Cited

U.S. PATENT DOCUMENTS

| | | | |
|---|---|---|---|
| 7,359,114 B2 | 4/2008 | Sauter et al. | |
| 7,541,581 B2 | 6/2009 | Reed et al. | |
| 2008/0245966 A1* | 10/2008 | Wu et al. | ........................ 250/330 |
| 2009/0051760 A1* | 2/2009 | Ottney | ............................ 348/53 |
| 2012/0044386 A1 | 2/2012 | Keitzer et al. | |
| 2012/0182417 A1 | 7/2012 | Everett | |

\* cited by examiner

*Primary Examiner* — Trung Diep
(74) *Attorney, Agent, or Firm* — The Webb Law Firm

(57) ABSTRACT

Provided herein is an imager device for fusing an image from multiple sources. The device includes a focal plane array detector for obtaining an image of a scene at a first wavelength; a display projector for projecting a projected image of the scene obtained by the focal plane array detector at a second wavelength; and a splitter/combiner element positioned to direct a line of sight of the focal plane array detector in a first direction and to direct the projected image in a second direction. The device is configured such that a normal line of sight having a third wavelength passes through the splitter/combiner element without being deflected by the splitter/combiner element. An assembly including an optical scope and an imager device for fusing an image from multiple sources is also provided. The scope may be a direct view optical scope or an indirect view optical scope.

20 Claims, 2 Drawing Sheets

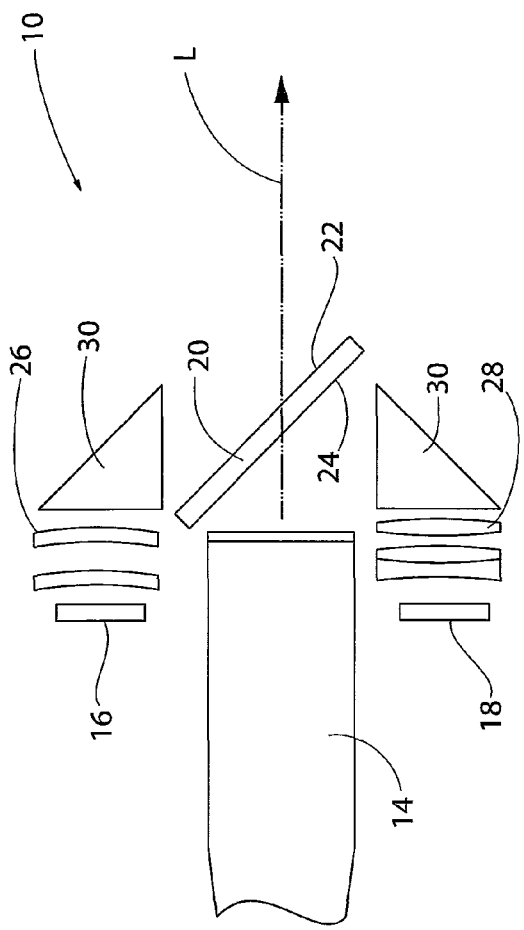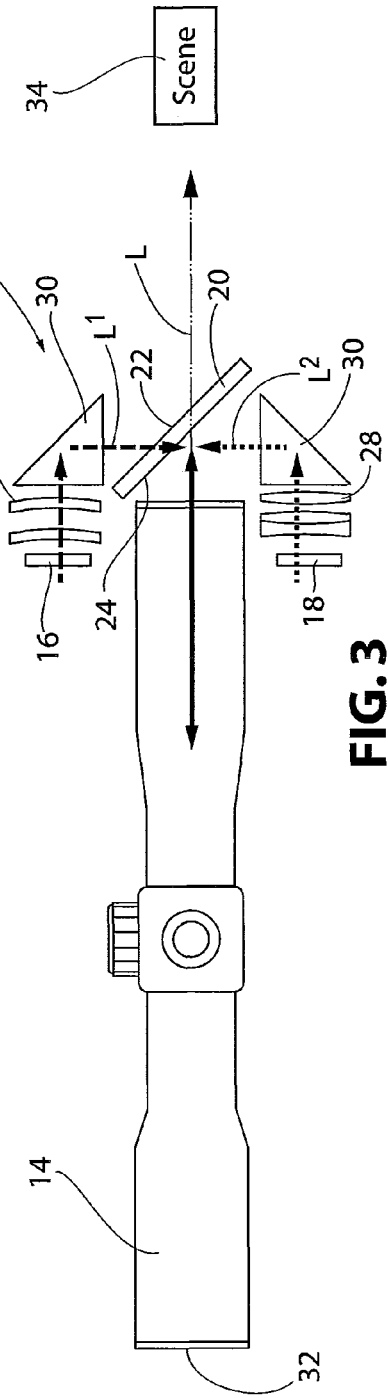
FIG. 2
FIG. 3

IMAGER DEVICE FOR FUSING AN IMAGE FROM MULTIPLE SOURCES

CROSS REFERENCE TO RELATED APPLICATIONS

This application claims the benefit of U.S. Provisional Patent Application No. 61/680,489 entitled "Fusion Clip-On Scope" filed Aug. 7, 2012, which is hereby incorporated by reference in its entirety.

BACKGROUND OF THE INVENTION

1. Field of the Invention

The present invention is generally directed to an imaging device for use with an optical scope and, more particularly, to an imaging device configured such that an image generated by the device aligns with and overlays a scene image from the scope.

2. Description of Related Art

Military rifle operators are well trained in the use of direct view optical (DVO) scopes attached to the top of their guns. The DVO provides optical magnification as well projected reticles that help the operator determine the target range and firing solution. Because of the criticality of the alignment of the DVO to the gun barrel, military operators are often unwilling to remove the DVO in order to exchange it for a different type of scope technology, such as a thermal night vision imager.

Instead, devices known as clip-on imager devices are available that attach in front of the existing DVO scope to provide alternative scope technologies. The clip-on device includes a focal plane array (FPA) detector, such as a thermal imager or night vision intensifier, and objective optics to focus the scene (i.e. the vision field) onto the FPA detector. The detector may operate in any of a variety of spectral regions, including near-infrared (0.6-1.0 microns), short-wave infrared (1.0-2.5 microns), or thermal infrared (3-5 or 8-12 microns). Generally, the clip-on imager has a unity 1× total magnification so that it can be attached and removed from the host scope platform without changing the boresight relationships. The clip-on sensor is typically also designed to provide a field of view comparable to that of the original DVO scope. The clip-on imager also includes a display device and optics to collimate the display to the DVO scope.

An exemplary clip-on imager assembly, as is known in the prior art, is depicted in FIG. 1. As shown in FIG. 1, the clip-on imager device 10 is connected to a rifle barrel 12, and aligned with the DVO scope 14. The imager device 10 includes an FPA detector 16 and display device 18. The imager 10 further includes objective optics 26 for focusing an image onto the FPA detector 16 and projector optics 28 for collimating the displayed image back to the scope 14. In assemblies such as the assembly of FIG. 1, the DVO scope 14 effectively becomes part of the eyepiece for the entire assembly. In this case, the "normal" image of the DVO scope is no longer visible to the operator, as it is replaced by the image provided by the FPA detector 16. Clip-on imaging devices arranged as depicted in FIG. 1, are disclosed, for example, in U.S. Pat. No. 7,359,114 and U.S. Pat. No. 7,541,581.

The disadvantage of the current state of the art is that the clip-on device obscures the normal function of the DVO scope. Thus, the operator is made entirely dependent on the display projection and can no longer see the scenery directly. Therefore, an apparatus and method for aligning and overlaying the normal imagery of the DVO scope with the image obtained by the FPA detector of the clip-on device is needed. In this case, the user is able to "see" imagery from both sources at the same time. The device and assembly of the present invention are configured to provide such benefits.

SUMMARY OF THE INVENTION

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

In accordance with a non-limiting embodiment of the invention, an imager device for fusing an image from multiple sources is provided. The device includes a focal plane array detector for obtaining an image of a scene at a first wavelength; a display projector for projecting a projected image of the scene obtained by the focal plane array detector at a second wavelength; and a splitter/combiner element positioned to direct a line of sight of the focal plane array detector in a first direction and to direct the projected image in a second direction. The device is configured such that a normal line of sight having a third wavelength passes through the splitter/combiner element without being deflected by the splitter/combiner element.

In accordance with a further non-limiting embodiment of the invention, an assembly for viewing an image fused from multiple sources is provided. The assembly includes an optical scope, such as a direct view optical scope or an indirect view optical scope and an imager device associated with the scope and positioned such that a line of sight of the scope extends though the imager device. The imager device includes: a focal plane array detector for obtaining an image of a scene at a first wavelength; a display projector for projecting a projected image obtained by the focal plane array detector at a second wavelength; and a splitter/combiner element positioned to direct a line of sight of the focal plane array detector to the scene and to direct the projected image to the scope. The imager device is configured such that the line of sight of the scope, within a third wavelength, passes through the splitter/combiner element without being reflected.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

FIG. 2 is a schematic drawing of an imager device in accordance with an embodiment of the invention; and FIG. 3 is a schematic drawing of an assembly including the imager device of FIG. 2 in accordance with an embodiment of the invention.

DESCRIPTION OF THE PREFERRED EMBODIMENTS

Figure 1:
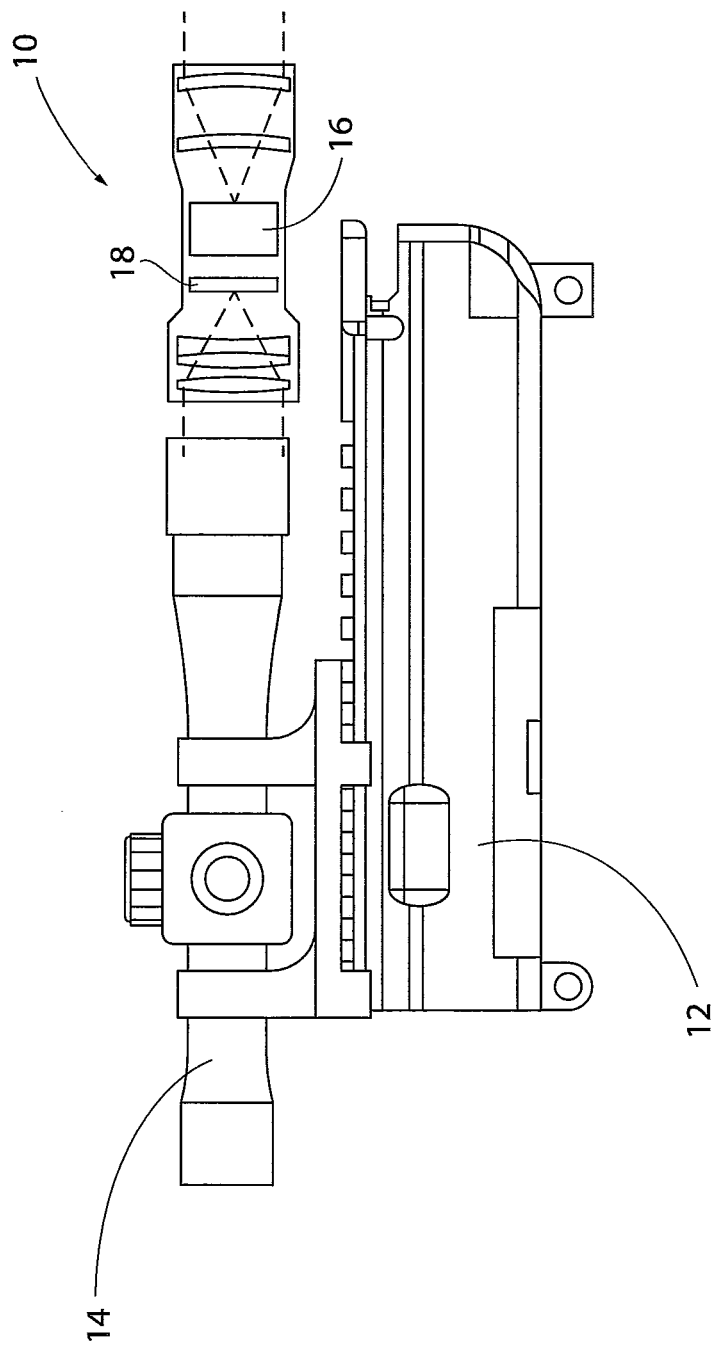
FIG. 1 is a schematic drawing of an assembly for a clip-on imager device as is known in the prior art.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. In addition, the term "proximal" is defined as related to the portion of the assembly or device acted upon by a user, such as the eyepiece of a scope. The term "distal" is defined as the portion of the device or assembly positioned opposite the "proximal" portion. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The present invention is drawn to an imager device 10 for aligning and overlaying a "normal" image, such as an image obtained by a DVO scope 14, with a projected image provided from a second source, such as an FPA detector 16. Additional detector devices may also be used, within the scope of the present invention, including, but not limited to, thermal arrays, image intensifier tubes, CCD camera detectors, and similar electronic devices. The normal image and the projected image are viewed along the same line of sight so that visual distortion, such as parallax, is avoided.

In certain embodiments, the imager 10 is configured to attach to an existing DVO scope 14 mounted to a rifle barrel (not shown in FIG. 2). The imager 10 may be attached to other direct view optical devices, such as binoculars, night vision goggles, infrared viewing systems, video recorders, telescopes, and the like. In addition, as will be appreciated by one having ordinary skill in the art, the same principle of operation applies to an imager device for an existing indirect view optic (IVO) scope, such as an image intensifier device that contains its own objective lens and eyepiece. However, for the purpose of discussion herein, the term DVO is interchangeable with IVO.

With reference to FIG. 2, a non-limiting embodiment of an imager device 10 is depicted. The imager device 10 includes a splitter/combiner element 20 configured to direct a line of sight of a FPA detector 16 in a first direction, such as outward toward a scene (i.e. field of view). Simultaneously, the splitter/combiner element 20 is also configured to direct a display projected output in a second direction, such as into a DVO scope 14. In the embodiment of FIG. 2, the splitter/combiner element 20 is positioned at a 45 degree angle relative to the line of sight L of the DVO scope 14. However, as will be appreciated by one having ordinary skill in the art, the angle of the element 20 is based on the position of the FPA detector 16 and display device 18.

The splitter/combiner element 20 may be fabricated from any optical material that transmits all or part of the visible spectrum (i.e. 0.4-0.7 microns) as perceived by the human eye. For example, the element 20 may be formed from most types of optical glass, as well as crystals such as calcium fluoride, "ClearTran" grade of zinc sulphide, zinc selenide, or sapphire. More specifically, the splitter/combiner element 20 is an optical element that provides a neutral optical power (i.e. must be optically flat). The element 20 should be of a sufficient thickness that it will not be damaged in the intended usage environment and is sized to capture the entire optical beam that normally enters the DVO scope 14. In order to maintain boresight, it is recommended that the splitter/combiner element 20 is firmly mounted to a housing and/or associated mount of the imager device 10.

The front surface 22 and the back surface 24 of the element 20 are coated to ensure that the display device 18 image and FPA detector 16 line of sight are directed in the correct orientation. More specifically, the front surface 22 is coated with a material capable of passing through all or part of the visible spectrum, but which reflects the spectrum employed by the FPA detector 16. The FPA detector 16 may include an image intensifier tube, which operates in the 0.6-0.9 micron spectrum, or an un-cooled micro-bolometer for thermal imaging that operates in the 8-12 micron spectrum. The FPA detector 16 may also operate in the short-wave infrared spectrum (about 1.0-2.5 microns). The back surface 24 of the element 20 includes a coating capable of reflecting the wavelength of the display device, but which allows the wavelength of the visible spectrum, or part of the visible spectrum, to pass through the element. For image intensifiers, the wavelength of the display device 18 is typically a narrow band centered on the P43 phosphor with a peak at about 0.545 microns. For clip-on devices with color addressable micro-displays, the narrow band can be nearly any color region within visible spectrum.

With continued reference to FIG. 2, the FPA detector 16, unlike the imager devices of the prior art, is not positioned along the line of sight L of the scope 14. Instead, objective optics 26 are positioned to direct the line of sight of the FPA detector 16 through the splitter/combiner element 20. The FPA detector 16 is associated with the display device 18, such that the display projects the image obtained by the FPA detector 16. The display device 18 includes projector optics 28 for projecting the displayed image to the scope 14 through the splitter/combiner element 20. In certain embodiments, the FPA detector 16 and display device 18 include fold prisms 30 for reflecting the image from the splitter/combiner element 20 to the FPA detector 16 and display device 18. The fold prisms 30 are used merely to save space for improved packaging. Other configurations of the objective optics 26 and projector optics 28 using other lens and collimator elements, as are known in the art, may be used for alternative positioning of the FPA detector 16 and display device 18 relative to the line of sight L of the scope 14.

With reference to FIG. 3, in use, an operator looks through an eyepiece 32 of a traditional DVO scope 14. The DVO scope 14 is arranged such that the line of sight L passes longitudinally through the scope 14 and splitter/combiner element 20 of the imager device 10. Since the splitter/combiner element 20 does not reflect or distort light within the visible spectrum, the operator "sees" a normal view of a scene 34 within the line of sight L. The scene 34 is also within the line of sight $L^1$ of the FPA detector 16. More specifically, the line of sight $L^1$ of the FPA detector 16 passes through the objective optics 26 and is directed by the splitter/combiner element 20 to the scene 34. Once an image of the scene is recorded by the FPA detector 16, the recorded image passes to the display device 18. The image is projected along line $L^2$ by the display device 18, through the projector optics 28 to the splitter/combiner element 20. The splitter/combiner element 20 directs the projected image to the scope 14. In this way, the operator is presented with a view of both the image projected by the display device 18 and the normal image, which would be viewed through the scope. Thus, the operator "sees" the projected image aligned with and overlaid upon the normal image.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. An imager device for fusing an image from multiple sources configured to be removeably connected to an optical scope, the imager device comprising:
    a focal plane array detector for obtaining an image of a scene at a first wavelength;
    a display projector for projecting a projected image of the scene obtained by the focal plane array detector at a second wavelength; and
    a splitter/combiner element positioned to direct a line of sight of the focal plane array detector in a first direction and to direct the projected image in a second direction,
    wherein a normal line of sight having a third wavelength passes through the splitter/combiner element without being deflected by the splitter/combiner element.

2. The imager device of claim 1, wherein the line of sight of the focal plane array detector and the normal line of sight share a common axis.

3. The imager device of claim 1, wherein the first, second, and third wavelengths do not overlap.

4. The imager device of claim 1, wherein the third wavelength is within all or part of a visual spectrum as perceived by the human eye, and wherein the splitter/combiner element is formed from a material that transmits all or part of the visible spectrum.

5. The imager device of claim 4, wherein the splitter/combiner element is formed from one or more of the following materials: optical glass, calcium fluoride, "ClearTran" grade of zinc sulphide, zinc selenide, or sapphire.

6. The imager device of claim 1, wherein a front surface of the splitter/combiner element is coated with a coating capable of reflecting the first wavelength.

7. The imager device of claim 1, wherein a back surface of the splitter/combiner element is coated with a coating capable of reflecting the second wavelength.

8. The imager device of claim 1, wherein, when viewed along the normal line of sight, the projected image is overlaid and aligned with a normal image of the scene.

9. The imager device of claim 1, wherein the first wavelength is within the near-infrared range, short-wave infrared range, or thermal infrared range.

10. The imager device of claim 1, wherein the second wavelength is centered on P43 phosphor with a peak at about 0.5 microns.

11. The imager device of claim 1, further comprising objective optical elements for directing the line of sight of the focal plane array to the splitter/combiner element, and projector optical elements, for directing a display device output to the splitter/combiner element.

12. The imager device of claim 11, wherein the objective optical elements and the projector optical elements include one or more fold prisms.

13. The imager device of claim 1, wherein the normal line of sight of the imager device is coaxial with the line of sight of the optical scope.

14. An assembly for viewing an image fused from multiple sources, the assembly comprising:
    an optical scope; and
    an imager device configured to be removeably connected to the optical scope and positioned such that a line of sight of the optical scope extends through the imager device, the imager device comprising:
        a focal plane array detector for obtaining an image of a scene at a first wavelength;
        a display projector for projecting a projected image obtained by the focal plane array detector at a second wavelength; and
        a splitter/combiner element positioned to direct a line of sight of the focal plane array detector to the scene and to direct the projected image to the scope,
        wherein the line of sight of the scope, within a third wavelength, passes through the splitter/combiner element without being reflected.

15. The assembly of claim 14, wherein the line of sight of the scope and the line of sight of the focal plane array are along a common axis.

16. The assembly of claim 14, wherein the scope is a direct view optical scope or an indirect view optical scope.

17. The assembly of claim 14, wherein the first, second, and third, wavelengths do not overlap.

18. The assembly of claim 14, wherein the assembly is adapted attach to a rifle-mount rail system.

19. The assembly of claim 14, wherein the assembly is adapted to attach to a head mounted goggle system.

20. A removable clip-on imaging device configured to be removeably inserted in front of an optical scope, the imaging device comprising a triple-function splitter/combiner element, the splitter/combiner element being configured to:
    direct a line of sight of an attached focal plane array detector toward a scene;
    direct a display projection into the optical scope for viewing an overlaid image over the scene; and
    permit a line of sight of the optical scope to pass through the splitter/combiner element without deflection to provide a normal image of the scene,
    wherein the respective lines of sight share a common axis without parallax.

* * * * *